(12) United States Patent
Lalli et al.

(10) Patent No.: US 11,530,042 B2
(45) Date of Patent: Dec. 20, 2022

(54) PASSENGER SEAT ASSEMBLY WITH INTEGRATED CABIN ATTENDANT SEAT

(71) Applicant: AMI Industries, Inc., Colorado Springs, CO (US)

(72) Inventors: Rodrigo A. Lalli, Kernersville, NC (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/235,086

(22) Filed: Apr. 20, 2021

(65) Prior Publication Data

US 2021/0331803 A1 Oct. 28, 2021

Related U.S. Application Data

(60) Provisional application No. 63/015,206, filed on Apr. 24, 2020.

(51) Int. Cl.
*B64D 11/06* (2006.01)
(52) U.S. Cl.
CPC ........ *B64D 11/0601* (2014.12); *B64D 11/064* (2014.12); *B64D 11/0691* (2014.12); *B64D 11/0696* (2013.01)
(58) Field of Classification Search
CPC .................. B64D 11/0691; B64D 11/0696
See application file for complete search history.

(56) References Cited

U.S. PATENT DOCUMENTS

| 5,335,963 | A | 8/1994 | Muller et al. | |
|---|---|---|---|---|
| 9,796,296 | B2 | 10/2017 | Cailleteau | |
| 10,005,558 | B2 | 6/2018 | Cailleteau | |
| 2017/0267356 | A1* | 9/2017 | Breuer | B64D 11/0639 |
| 2018/0057169 | A1* | 3/2018 | Phi | B60N 2/3013 |
| 2018/0155035 | A1* | 6/2018 | Spagl | B64D 11/0691 |
| 2021/0253257 | A1* | 8/2021 | Lokanatha | B64D 11/0691 |

FOREIGN PATENT DOCUMENTS

| CA | 3058153 A1 * | 4/2020 | ........... A47C 1/0342 |
|---|---|---|---|
| CA | 3065221 A1 * | 2/2021 | ........ B64D 11/0691 |
| WO | 2017072077 A1 | 5/2017 | |

OTHER PUBLICATIONS

EP Search Report for European Application No. 21170524.9 dated Aug. 31, 2021, 8 pages.

* cited by examiner

*Primary Examiner* — Timothy J Brindley
(74) *Attorney, Agent, or Firm* — Suiter Swantz pc llo

(57) ABSTRACT

A passenger seating assembly with an integrated cabin attendant seat (CAS) is disclosed. In embodiments, a CAS folds down from a monument mounted to the cabin floor via a combined track fitting that secures into the left-side or right-side track rail. A group of passenger seats (e.g., two to five) faces opposite the CAS monument and includes left-side and right-side leg assemblies mountable to the track rails via track fittings. One rear portion of a leg assembly attaches to the combined track fitting to integrate the passenger seats and CAS monument, eliminating unused space between the passenger seats and CAS monument.

8 Claims, 3 Drawing Sheets

PASSENGER SEAT ASSEMBLY WITH INTEGRATED CABIN ATTENDANT SEAT

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/015,206 entitled PASSENGER SEAT ASSEMBLY WITH INTEGRATED CABIN ATTENDANT SEAT, filed Apr. 24, 2020;

Said U.S. Provisional Patent Application 63/015,206 is herein incorporated by reference in its entirety.

TECHNICAL FIELD

The subject matter disclosed by the instant application is directed generally to aircraft interiors and more particularly to passenger seating for commercial aircraft.

BACKGROUND

Many commercial aircraft cabins are laid out in such a way that cabin attendant seats (CAS) intended for temporary short-term use by cabin crewmembers (e.g., during takeoff and landing procedures to provide crewmembers with a seated but high-visibility position) may be installed directly behind a passenger seat or block thereof, facing in the opposite direction. However, this conventional installation results in unused cabin space that might otherwise provide more room for additional passenger seating or enhanced passenger comfort.

SUMMARY

A passenger seating assembly with an integrated cabin attendant seat (CAS) is disclosed. In embodiments, the passenger seating assembly accommodates one or more passengers (e.g., a single seat or group thereof, generally two to five seats) and includes left-side and right-side leg assemblies mounted to left-side and right-side track rails set into an aircraft cabin floor by left-side and right-side track fittings. The passenger seating assembly includes a cabin attendant seat (CAS) assembly, the CAS assembly including a monument or similar structure mountable to the right-side or left-side track rail by a combined track fitting that also accommodates either the left-side or right-side leg assembly of the passenger seating assembly (e.g., which attaches to the combined track fitting instead of attaching directly to the track rail by its own track fitting). The monument includes a cabin attendant seat (e.g., facing opposite the passenger seats) that deploys from the monument for use by a cabin crewmember.

In some embodiments, the group of passenger seats faces forward, and the CAS faces aft (e.g., accommodates an aft-facing crewmember when in the deployed configuration).

In some embodiments, the group of passenger seats includes a seat oriented directly opposite the CAS monument, the seat precluded from reclining.

In some embodiments, the left-side and right-side leg assemblies include forward and rear leg portions, each leg portion attachable to a track rail by its own track fitting. Either the left-side or right-side rear leg portion, however, attaches to the combined track fitting instead of to its own track fitting.

In some embodiments, the rear leg portion attaches to the combined track fitting via a quick-release pin.

In some embodiments, the monument includes a headrest for the crewmember occupying the deployed CAS.

In some embodiments, the left-side and right-side track rails are inboard and outboard track rails (e.g., inboard track rails proximate to a central aisle of the cabin, or outboard track rails proximate to a window or bulkhead). For example, the combined track fitting may be mountable to the outboard track rail (e.g., for a CAS adjacent to the window or bulkhead).

In some embodiments, the CAS monument is anchored to the cabin floor by additional auxiliary floor fittings.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
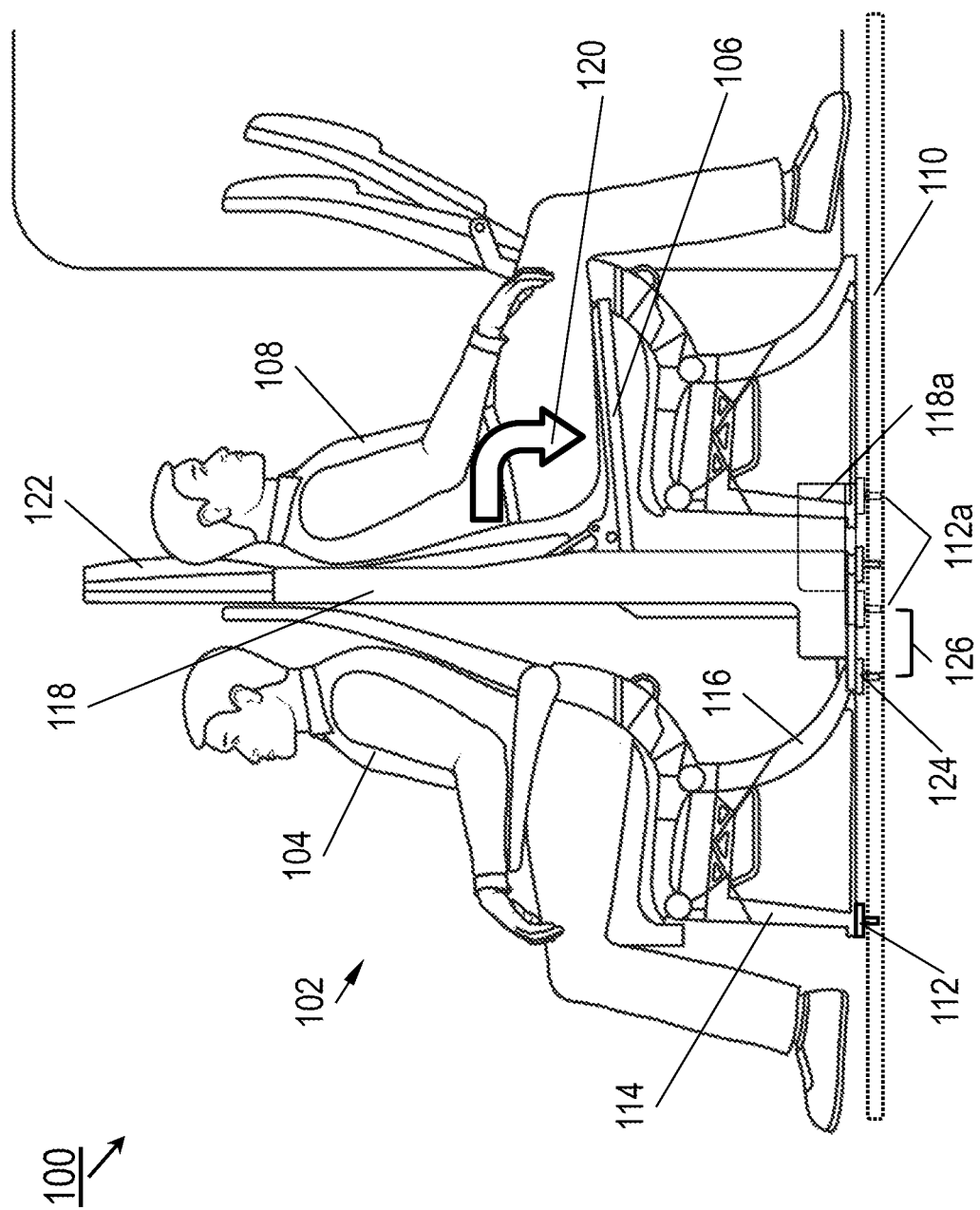
FIG. 1 is a profile view of a passenger seating assembly with integrated CAS according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a mutually integrated cabin attendant seat (CAS) and passenger seating assembly. The mutually integrated CAS/passenger seating assembly gains additional cabin space (e.g., for improved legroom or extra rows of economy seating) by eliminating the unused space that would otherwise exist between an aft-mounted CAS (e.g., adjacent to an exit door or passageway) and a proximate row of forward-mounted passenger seats.

Referring to FIG. 1, an aircraft cabin 100 is disclosed. The aircraft cabin 100 may include a passenger seat 102 configured to accommodate a passenger 104, and a cabin attendant seat (CAS) 106 configured to accommodate a cabin crewmember 108.

In embodiments, the aircraft cabin may include several track rails 110 extending substantially parallel along the cabin floor. For example, the passenger seat 102 and CAS 106 may both be mounted in the passenger cabin via track rail fittings 112 (e.g., floor fittings), anchoring the passenger seat and CAS to the track rails 110. The passenger seat 102 may incorporate forward legs 114 and rear legs 116, the forward and rear legs anchored to the track rails 110. In some embodiments, a single-aisle aircraft may incorporate a set of parallel track rails 110 (e.g., a left track rail and a right track rail; one set of parallel track rails on either side of the center aisle) extending parallel to the aisle, substantially parallel to the longitudinal axis of the aircraft. For example, the passenger seats 102 may be anchored to each track rail 110 by a track rail fitting 112, which may provide a measure of impact dampening in the event of a rapid deceleration.

In embodiments, the passenger seat 102 may be oriented to face forward (e.g., in the direction of flight, toward the cockpit) and the CAS 106 oriented to face aft (e.g., to provide the cabin crewmember 108 temporarily seated therein with a direct view of a portion of the aircraft cabin 100 directly behind the passenger seat). For example, the CAS 106 may be incorporated into a monument 118 anchored to the track rails 110 by track rail fittings 112, the CAS proper capable of deploying (120; e.g., folding downward) from the monument for temporary use. The CAS 106 may further include a headrest (122) integrated into the monument for use by the crewmember 108 occupying the CAS.

In embodiments, the passenger seat 102 and CAS 106 may be mutually integrated via a combined track fitting 124. For example, the combined track fitting 124 may integrate a rear track fitting for a rear leg 116 of the passenger seat and a forward track fitting for the monument 118. Whereas a conventional CAS monument (118a) may be mounted to the track rails 110 via track rail fittings (112a) allowing for unused space (126; e.g., approximately 5 inches as shown) behind the passenger seat 102, integrating the passenger seat and CAS 106 into a single combined track fitting 124 may free this otherwise unused space (e.g., for additional seating or legroom).

Figure 2:
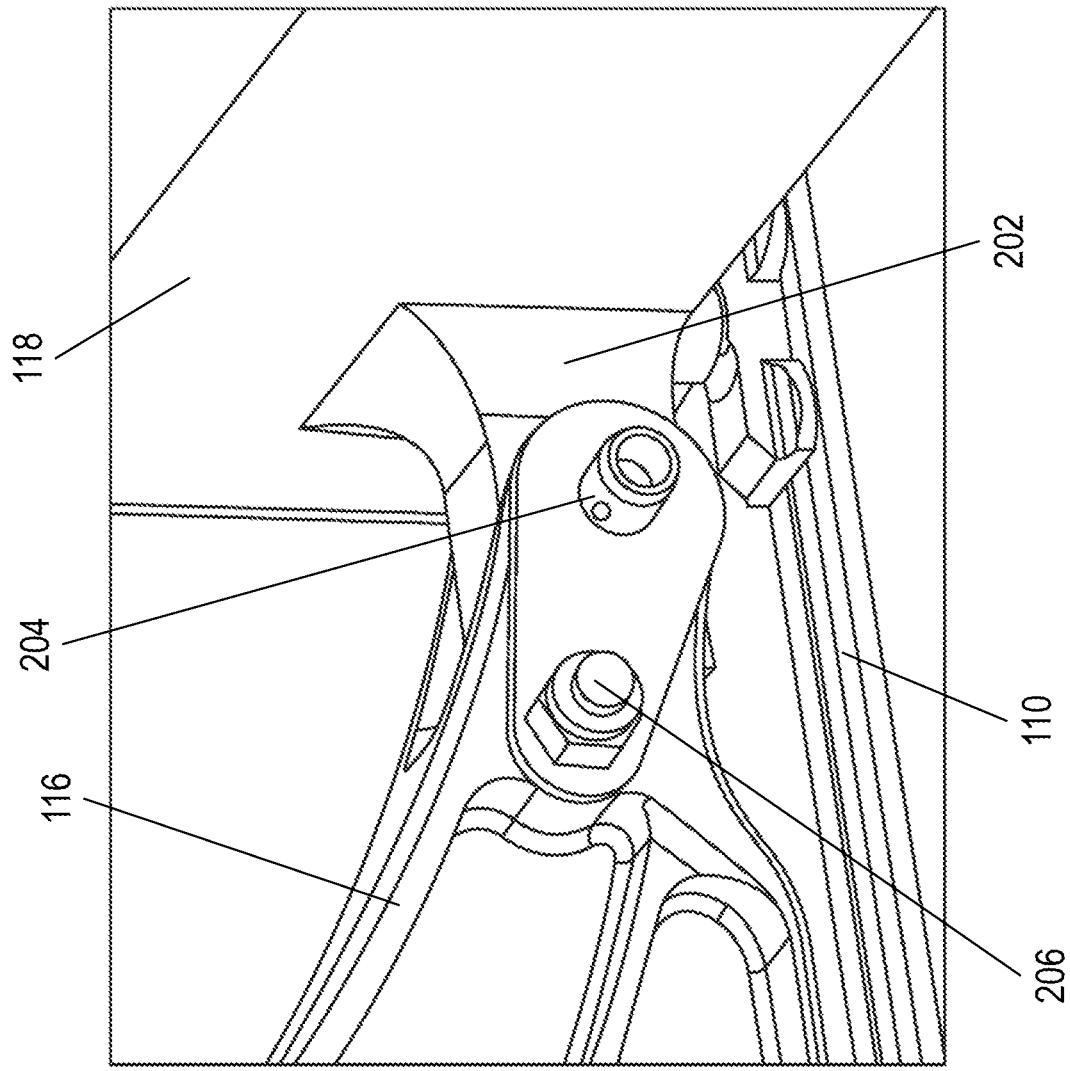
FIG. 2 is a detailed view of the passenger seating assembly of FIG. 1.

Referring to FIG. 2, the combined track fitting 124 is disclosed.

In embodiments, the combined track fitting 124 may anchor the monument 118 to the track rail 110 and include an attachment 202 to which a rear leg 116 of the passenger seat (102, FIG. 1) may be fixed or mounted. For example, the rear leg 116 may be attached to the combined track fitting 124 by a quick-release pin 204. In some embodiments, the rear leg 116 may be further bolted (206) to the combined track fitting.

Figure 3:
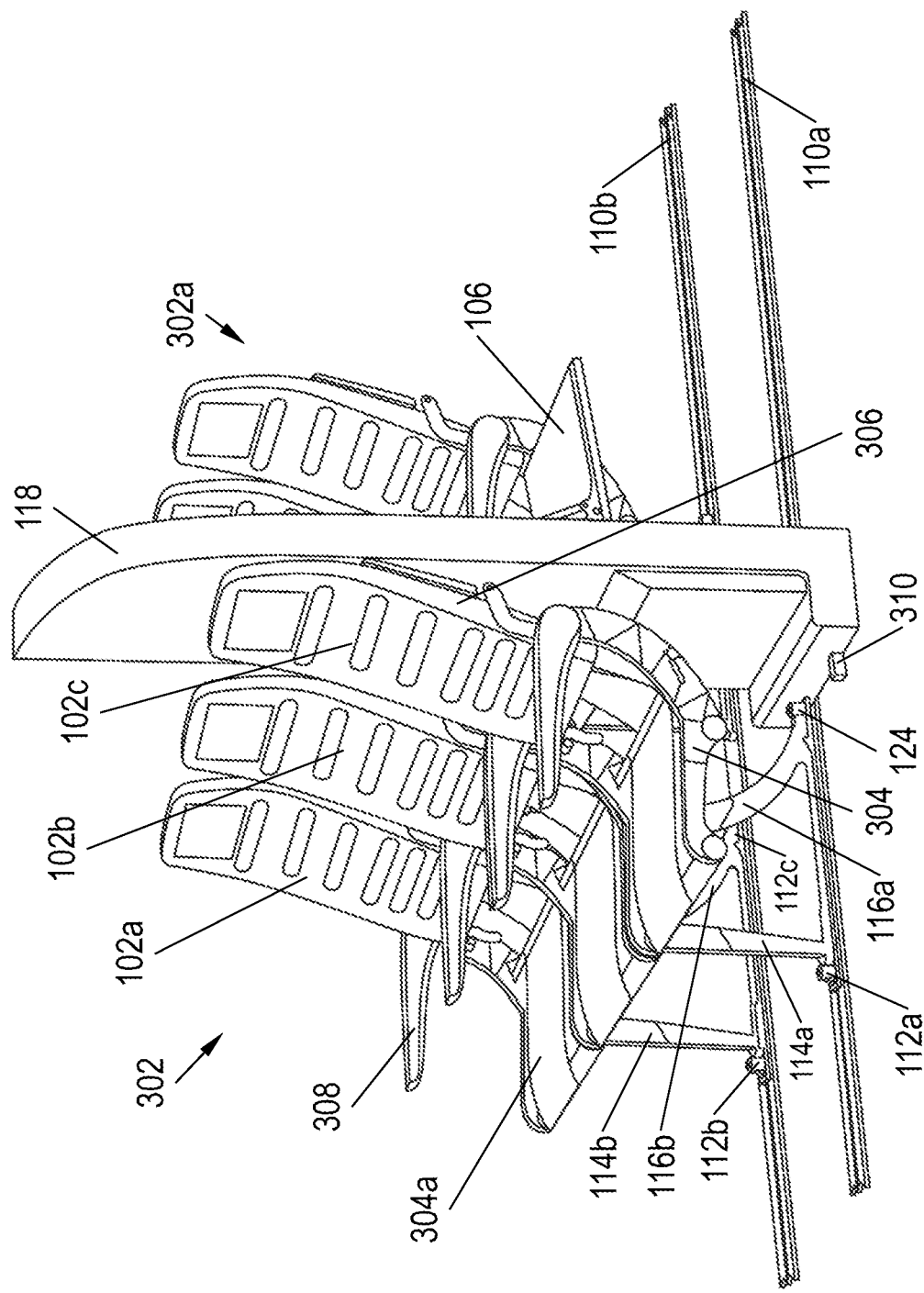
FIG. 3 is an isometric view of the passenger seating assembly of FIG. 1.

Referring to FIG. 3, the aircraft cabin 100 is shown.

In embodiments, the aircraft cabin 100 may include passenger seating assemblies 302 on one side of an aisle, each passenger seating assembly 302 including a group of passenger seats 102a-c commonly mounted to outboard and inboard track rails 110a-b. In some embodiments, the aircraft cabin 100 may be embodied in a single-aisle aircraft incorporating passenger seating assemblies 302, 302a of two or three seats each on either side of a center aisle. In some embodiments, the aircraft cabin 100 may be embodied in a widebody aircraft incorporating more than one center aisle and multiple types of passenger seating assemblies 302, 302a including between two and five seats, e.g., between an outer bulkhead and the aisle or between a left-side aisle and a right-side aisle.

In embodiments, each passenger seat 102a-c of the passenger seating assembly 302 may incorporate a seat frame 304 or seat cushion 304a, seatback 306, and armrests 308 (e.g., two adjacent passenger seats 102a-b may share an armrest). The forward legs (114, FIG. 1) and rear legs (116, FIG. 1) of the passenger seating assembly 302 may be attached to the seat frames 304. For example, an outboard forward leg 114a may be mounted to the outboard track rail 110a in the floor of the aircraft cabin 100 (e.g., by a track rail fitting 112a, FIG. 1). Similarly, an inboard forward leg 114b and inboard rear leg 116b may be mounted to the inboard track rail 110b in the floor of the aircraft cabin 100 (e.g., by track rail fittings 112b-c).

In embodiments, the outboard rear leg 116a of the passenger seating assembly 302 may be mounted to the outboard track rail 110a via the combined track fitting 124 shared with the monument 118. For example, the monument 118 may be positioned directly behind the outboard or window passenger seat 102c, which may be precluded from reclining (as opposed to the adjacent passenger seats 102a-b) by the monument. In some embodiments, the monument 118 may include an auxiliary floor fitting 310 additionally anchoring the monument to the floor of the aircraft cabin 100.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A passenger seating assembly with an integrated cabin attendant seat (CAS), comprising:
    a cabin attendant seat (CAS) assembly including:
    at least one monument mounted to a floor of an aircraft cabin via a combined track fitting configured for anchoring the monument to a first track rail of a pair of parallel track rails extending along the floor;
    a CAS pivotably attached to the monument, the CAS configured:
        1) To pivot between a stowed configuration and a deployed configuration;
        and
        2) to accommodate a crewmember when in the deployed configuration;
    and
    a passenger seating assembly comprising:
        at least two passenger seats, each passenger seat configured for accommodating a passenger;
        a first leg assembly mounted to the floor via a second track rail of the pair of parallel track rails;
        and
        a second leg assembly including at least one rear leg portion mounted to the floor via the combined track fitting.

2. The passenger seating assembly of claim 1, wherein:
the at least two passenger seats are configured to face in a first direction;
and
the CAS is configured to accommodate the crewmember facing in a second direction when in the deployed configuration, the second direction opposite the first direction.

3. The passenger seating assembly of claim 2, wherein:
the at least two passenger seats include a first passenger seat oriented directly opposite the CAS, the first passenger seat not configured to recline.

4. The passenger seating assembly of claim 1, wherein:
the first leg assembly includes a first forward leg portion and a first rear leg portion, each leg portion mounted to the second track rail via at least one track fitting;
and
the second leg assembly includes:
    a second forward leg mounted to the first track rail via at least one track fitting;
    and
    a second rear leg mounted to the first track rail via the combined track fitting.

5. The passenger seating assembly of claim 4, wherein the second rear leg portion is mounted to the combined track fitting via a quick-release pin.

6. The passenger seating assembly of claim 1, wherein the monument includes at least one headrest configured to accommodate a head of the crewmember.

7. The passenger seating assembly of claim 1, wherein:
the pair of parallel track rails includes an inboard track rail and an outboard track rail;
and
the combined track fitting is mounted to the outboard track rail.

8. The passenger seating assembly of claim 1, further comprising:
at least one auxiliary floor fitting configured for anchoring the monument to the floor.

* * * * *